United States Patent [19]

Itoh et al.

[11] Patent Number: 4,763,268
[45] Date of Patent: Aug. 9, 1988

[54] DIRECTION DISPLAY APPARATUS

[75] Inventors: Hisatsugu Itoh; Kosaku Uota, both of Himeji, Japan

[73] Assignee: Mitsubishi Denki Kabushiki Kaisha, Japan

[21] Appl. No.: 854,629

[22] Filed: Apr. 22, 1986

[30] Foreign Application Priority Data

Apr. 23, 1985 [JP] Japan .................................. 60-86760

[51] Int. Cl.$^4$ ...................... G01C 21/00; G06F 15/50
[52] U.S. Cl. ..................................... 364/449; 364/444; 340/988
[58] Field of Search ............... 364/443, 444, 449, 460, 364/521, 571; 342/450–452; 73/178 R; 340/988, 990, 995

[56] References Cited

U.S. PATENT DOCUMENTS

| 4,543,572 | 9/1985 | Tanaka et al. | 340/995 |
| 4,563,685 | 1/1986 | Matsumoto et al. | 340/995 |
| 4,608,656 | 8/1986 | Tanaka et al. | 340/988 |
| 4,642,776 | 2/1987 | Matsumoto et al. | 340/988 |
| 4,663,719 | 5/1987 | Matsumoto et al. | 340/988 |

FOREIGN PATENT DOCUMENTS 58-2611  1/1983  Japan ................... 364/449
58-27009 2/1983  Japan ................... 364/449

OTHER PUBLICATIONS

"Cathode-Ray Tube Information Center with Automotive Navigation", Jarvis et al., *Society of Automotive Engineers, Inc.*, Feb. 1984.
"On-Board Computer System for Navigation, Orientation and Route Optimization", Peter Haeussermann, *SAE The Engineering Resource for Advancing Mobility*, International Congress and Exposition, Feb. 27–Mar. 2, 1964, Japanese Pamphlet.

*Primary Examiner*—Gary Chin
*Attorney, Agent, or Firm*—Leydig, Voit & Mayer

[57] ABSTRACT

A direction display system utilizing a traveling azimuth of a vehicle and an angular coordinate of the vehicle on polar coordinates with an origin set at a specified location to determine a direction of the specified location to be displayed by the use of an indicator taken with reference to a pictorial display pattern of the vehicle. The traveling azimuth may also be used to determine a traveling direction of the vehicle so that both the direction of the specified location and the traveling direction of the vehicle can be selectively displayed on a single display unit operated by a switch.

4 Claims, 10 Drawing Sheets

DIRECTION DISPLAY APPARATUS

BACKGROUND OF THE INVENTION

This invention relates to a direction display apparatus which displays the direction of a certain specified location as viewed from a vehicle.

A system of this type has heretofore been, for example, disclosed in Japanese Patent Application Laid-open No. 56-35008. Such a system comprises an azimuth sensor for detecting terrestrial magnetism to measure the heading of the vehicle, a speed sensor for detecting the speed of the vehicle from the revolutions of the vehicle wheels, a calculation portion for executing calculations on the basis of signals from these sensors and signals from a keyboard for inputting data, and a display portion for displaying calculated results, and in which the relative position coordinate data of a starting location and a goal location is input beforehand. As the vehicle travels, its position at any instance from the starting location is found on the basis of the signals of the azimuth sensor and the speed sensor, and the residual running distance of the vehicle to the destination along with the direction of destination as viewed from the vehicle are displayed on the display portion.

In another direction display system, as described in Japanese Patent Application Laid-open No. 56-132513, it is recognized that Islamites make it a religious practice to worship Mecca at predetermined times every day anywhere they are. To fulfill this faithful act, they are required to know the direction of Mecca as viewed from wherever they are. As a result, the system disclosed in Japanese Patent Application No. 56-132513 is capable of determining the direction of one position relative to another. In particular, a magnetic needle turnably supported on a base plate and a map having the curves of equal bearings around Mecca depicted thereon are utilized. As in the foregoing system, when Mecca is set as the destination with its known position coordinate data, the direction of Mecca viewed from any location will be displayed on the display portion at the location.

However, since the computation of the position of the vehicle at any instance using the heading signal and the distance signal is performed by adding up an easterly or westerly movement component and a southerly or northerly movement component based on the heading of every unit distance, the cumulative errors of the added values indicative of the position will increase as the running distance increases. Furthermore, the errors of the heading detection attributed to a disturbance of the magnetic field, the inclinations of a car body, etc. and the errors of the distance detection attributed to dispersion in the outside diameter of wheels, slip, etc., will also affect the determination of the destination direction. Specifically, the direction of Mecca indicated by the display portion may contain a great error. Accordingly, the relative position coordinate data representing the position of the vehicle at an instance as the starting location and the position of Mecca as the destination need to be frequently input anew to avoid cumulative errors or before the errors enlarge. Such data, however, must be obtained by determining relative distances and directions (southerly/northerly or easterly/westerly) between Mecca and the position of the vehicle at different instances. This determination requires the cumbersome tasks of measuring the distances and directions from a map with a rule or special measuring tools and then computing the actual distances and directions using a contraction scale. Moreover, the position coordinate data thus obtained must be input by the use of a keyboard or similar inputting means.

Accordingly, prior-art systems have a problem in that the process for inputting the position coordinate data becomes very complciated, time consuming, and expensive.

SUMMARY OF THE INVENTION

This invention has as its objective the overcoming of the problem, and has for its more specific object to provide a direction display system which can display the direction of a specified location from any location through a simple manipulation.

The direction display apparatus according to this invention comprises traveling azimuth measurement means to measure a heading of a vehicle, angular coordinate input means to apply an angular coordinate of the vehicle on a polar coordinate system with an origin set at a specified location, specified direction calculation means to determine the direction of the specified location as viewed from the vehicle from the heading and the angular coordinate of the vehicle, and display means to display the direction of the specified location by the use of an indicator taken with reference to a pictorial display pattern of the vehicle.

BRIEF DESCRIPTION OF THE DRAWINGS

In the drawings, the same symbols indicate identical or corresponding portions.

DESCRIPTION OF THE PREFERRED EMBODIMENTS

Figure 1:
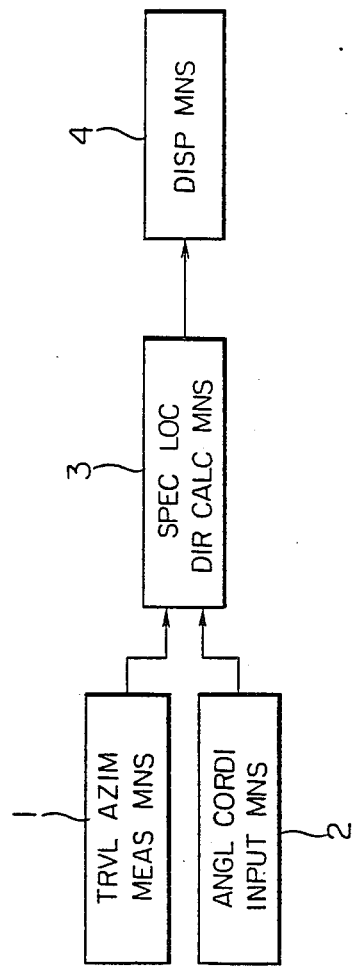
FIG. 1 is a block diagram showing the arrangement of a direction display system according to an embodiment of this invention.

FIG. 1 is a general block diagram showing an embodiment of a direction display apparatus according to this invention. Referring to the figure, the embodiment comprises traveling azimuth measurement means 1 to measure and produce an output representing the heading of a vehicle, angular coordinate input means 2 to determine and provide an output representing an angular coordinate of the vehicle on a polar coordinate system with an origin set at a specified location, specified location direction calculation means 3 responsive to the outputs of the traveling azimuth measurement means and the angular coordinate input means to determine the direction of the specified location from the vehicle, and display means 4 to display the direction of the specified location with reference to a display pattern representing the vehicle on the basis of the output of the specified location direction calculation means 3.

Figure 2:
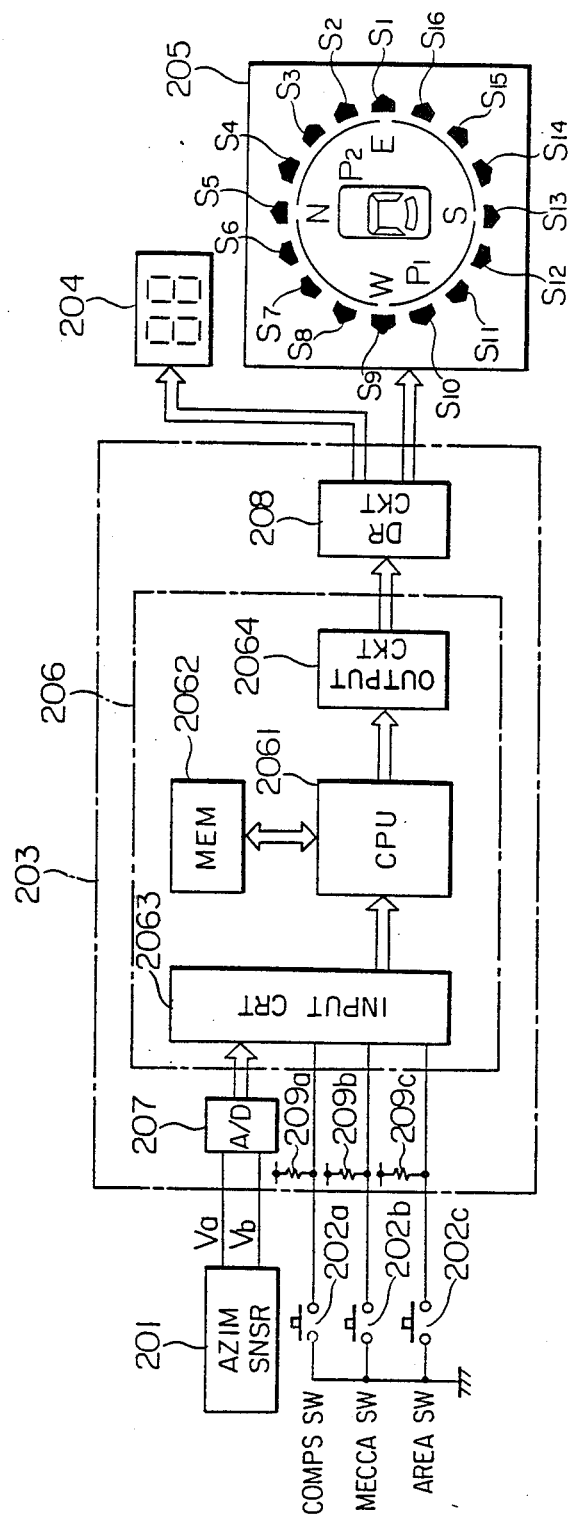
FIG. 2 is a diagram showing the practicable arrangement of the direction display system.
Figure 3:
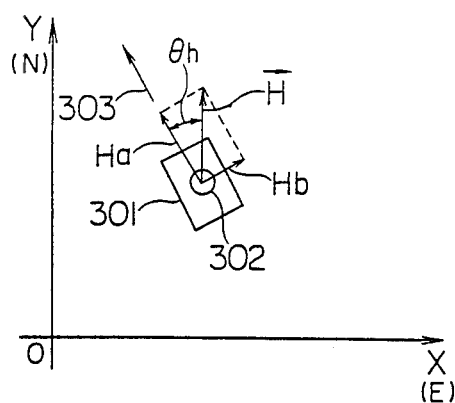
FIG. 3 is an explanatory diagram of an azimuth sensor in the direction display system.

FIG. 2 is a schematic diagram of the structural arrangement for concretely realizing the embodiment of FIG. 1. As shown, the arrangement includes an azimuth sensor 201, a compass switch 202a, a Mecca switch 202b, an area switch 202c, a control circuit 203, an area display unit 204 and a direction display unit 205.

By way of example, the azimuth sensor 201 is of a flux-gate-type terrestrial magnetism detector 302 fixed to a vehicle 301 to detect terrestrial magnetism $\vec{H}$ having a component Ha representing the heading of the vehicle 301 and a component Hb perpendicular thereto. The azimuth sensor 201 outputs D.C. voltage signals Va and Vb proportional to the components Ha and Hb, respectively.

The control circuit 203 is constructed of a microcomputer 206 which has a CPU 2061, a memory 2062, an input circuit 2063 and an output circuit 2064, an A/D (analog-to-digital) converter 207 by which the outputs Va and Vb from the azimuth sensor 201 are converted into digital values, a drive circuit 208 which causes the display units 204 and 205 to display data from the microcomputer 206, and resistors 209a–209c which serve as interfaces.

The outputs of the respective switches 202a–202c are applied to the input circuit 2063 of the microcomputer 206, and the outputs of the azimuth sensor 201 are applied to the A/D converter 207, the outputs of which are applied to the input circuit 2063 of the microcomputer 206. In addition, display data items created by the microcomputer 206 are applied from the output circuit 2064 thereof to the drive circuit 208, the outputs of which are applied to the display units 204 and 205.

The area display unit 204 is formed of a well-known numeral display device which employs fluorescent indicating tubes, a liquid crystal display panel, or the like. The direction display unit 205 similarly constructed of fluorescent indicating tubes, a liquid crystal display panel, or the like includes a pictorial display pattern $P_1$ of the vehicle with the symbols E, W, S and N reprsenting the respective headings of east, west, south and north, and a design pattern $P_2$ having sixteen indicators $S_1$–$S_{16}$ for indicating directions.

Next, the operation of the above embodiment will be described in detail in conjunction with FIGS. 4(a) and 4(b) which are flow charts of programs stored in the memory 2062 of the microcomputer 206.

Figure 5:
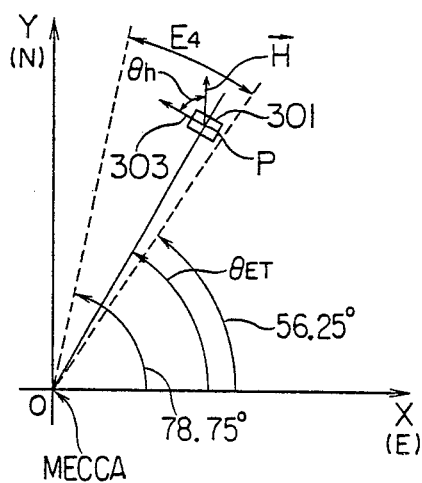
FIG. 5 is a diagram for explaining the direction computation of the direction display system.
Figure 4A:
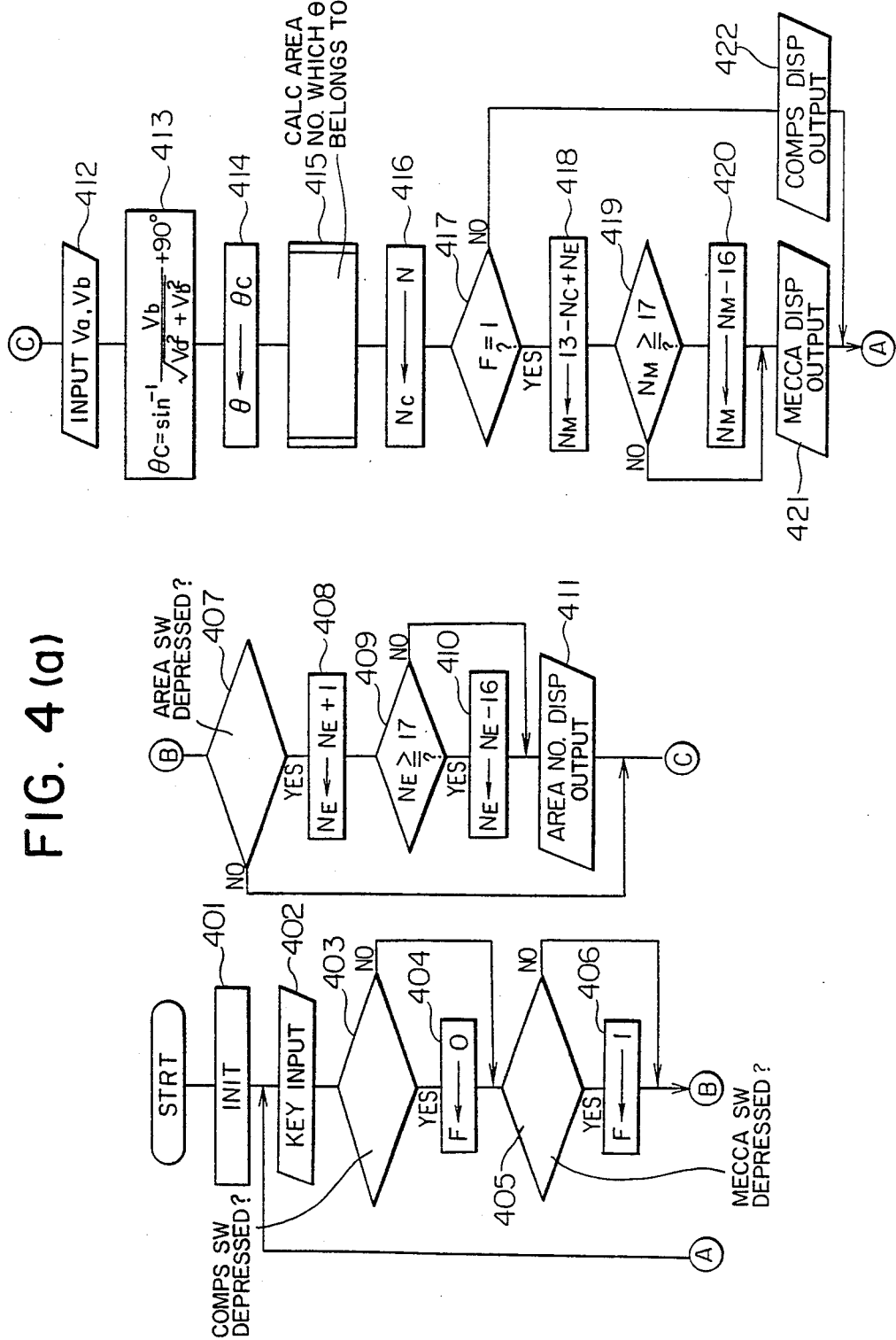
FIGS. 4(a) and 4(b) are flow charts showing the operation of the direction display system.

As shown in FIG. 4(a) upon the energization of the control circuit 203, the program variables and states are initialized at step 401. As shown in FIG. 5, it is now assumed that the vehicle 301 be at a stop at a location P (the angular coordinate $\theta_{ET}$ of which is assumed 60°) while the heading 303 thereof defines an angle $\theta_h$ (assumed 60°) to the terrestrial magnetism $\vec{H}$. Here, when the user depresses the compass switch 202a, the depression is detected and "0" is set for a flag F by the steps 402–404. The flag F serves to separately establish a mode for displaying the heading of the vehicle (hereinbelow, termed 'compass mode') and a mode for displaying the direction of Mecca (hereinbelow, termed 'Mecca mode').

Figure 6:
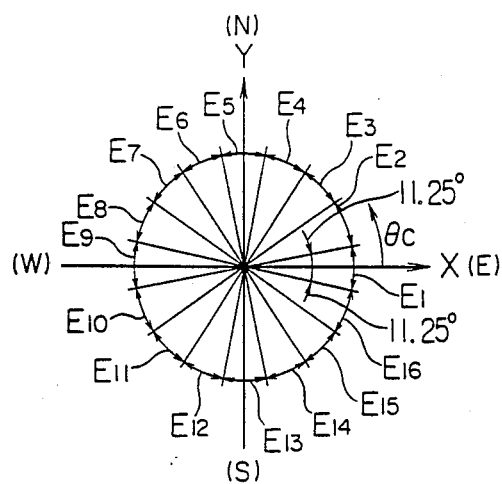
FIG. 6 is a diagram showing the relationship between the vehicle heading and an area in the direction display apparatus.

Subsequently, the outputs Va and Vb of the azimuth sensor 201 are input at the step 412, and the heading angle $\theta_c$ of the vehicle is evaluated at the step 413. The heading angle $\theta_c$ shall indicate an angle (0°–360°) from an X-axis on coordinates in FIG. 6. Accordingly, this angle $\theta_c$ is obtained by adding 90° to the angle $\theta_h$ defined between the terrestrial magnetism $\vec{H}$ and the heading 303 of the vehicle. Thus, $\theta_c = 150°$ holds in the present embodiment.

Subsequently, the content of a memory $\theta_c$ is transferred to a memory $\theta$ at the step 414, whereupon the subroutine 415 is executed. FIG. 4(b) is the flow chart showing the details of the subroutine, which calculates to find which of sixteen divided areas $E_1$–$E_{16}$ shown in FIG. 6 the angle $\theta$ belongs to. Thus, it is found from the value of a calculated result N that the angle $\theta$ belongs to an area $E_N$ (N = 1, 2, ..., 16). In the present embodiment, N = 8 holds, and the area becomes $E_8$.

Figure 7:
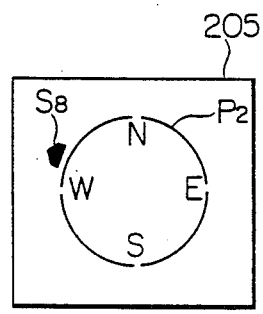
FIG. 7 is a diagram showing an example of display of the compass mode of the direction display apparatus.

Referring back to the main routine of FIG. 4(a) again, the content of a memory N is transferred to a memory $N_C$ (No. of an area to which the heading angle $\theta_c$ belongs) at the step 416. At the step 417, the step 422 is selected because the flag F = 0 (compass mode) is now held. At this step 422, a signal for displaying the heading angle $\theta_c$ of the vehicle is output to the direction display unit 205. That is, the indicator $S_n$ (n = 1, 2, ..., 16) of the direction display unit 205 is displayed in correspondence with the area $E_n$ (n = 1, 2, ..., 16) to which the heading angle $\theta_c$ belongs. Thus, in the present embodiment, since the area to which the heading angle $\theta_c$ belongs is $E_8$, the indicator $S_8$ pointing to the west-northwest direction is displayed as shown in FIG. 7. Further, the symbols E, W, S and N are displayed thereby to reliably inform the user of the fact that the display is of the compass mode.

Figure 8:
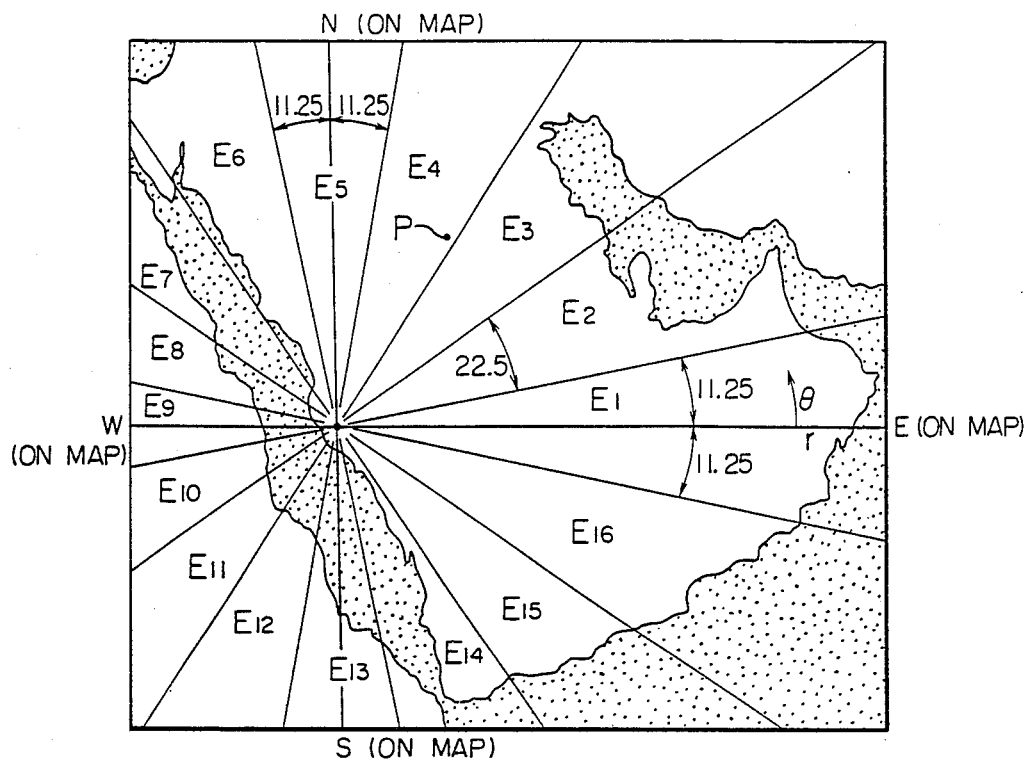
FIG. 8 is a diagram showing the map of and around Saudi Arabia with an area display in the direction display apparatus.

Next, in a case where the user wants to know the direction of Mecca, he/she depresses the Mecca switch 202b. The depression is detected at the step 405 in FIG. 4(a), and '1' is set for the flag F at the step 406. Next, the user searches for the area to which the current position of the vehicle belongs ($E_4$ in this example), by referring to a map in FIG. 8 and inputs the number 4 of this area $E_4$ by the use of the area switch 202b. The steps 407–410 serve to increase the area numbers $N_E$ each time the area switch 202b is depressed, whereby numbers 1–16 are set as $N_E$. The step 411 serves to output a signal for causing the area display unit 204 to display the number.

When the area number $N_E$ is set in this manner, the direction of Mecca is displayed. First, at the step 417, it is decided that the operation is the Mecca mode, and at the steps 418–420, the direction of Mecca as viewed from the vehicle is converted into number $N_M$ of the corresponding area on the coordinates of FIG. 9 on the basis of the area number $N_C$ of the heading (8 in the present embodiment) and the area number $N_E$ of the current position of the vehicle (4 in the present embodiment). In the present embodiment, $N_M = 9$ holds.

Figure 9:
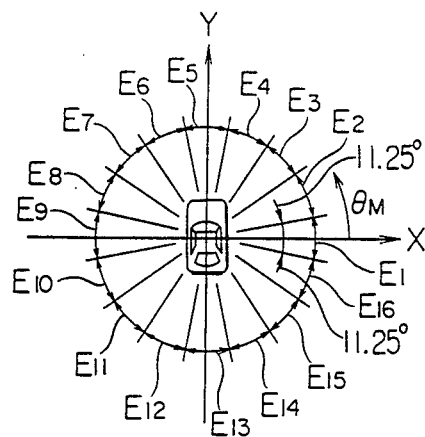
FIG. 9 is a diagram showing the relationship of the direction display apparatus between the direction and the area as viewed from a vehicle.
Figure 10:
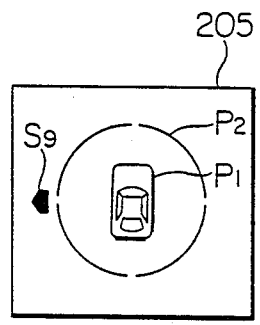
FIG. 10 is a diagram showing an example of display of the Mecca mode of the direction display apparatus.

Subsequently, a signal for displaying the direction of Mecca is output at the step 421. That is, the indicator $S_n$ (n = 1, 2, ..., 16) of the direction display unit 205 is displayed in correspondence with the area $E_n$ (n = 1, 2, ..., 16) of the direction display unit 205 is displayed in correspondence with the area $E_n$ (n = 1, 2, ..., 16)

found on the coordinates of FIG. 9. Thus, in the present embodiment, since the area is E9, the indicator S9 is displayed as shown in FIG. 10. Further, the pictorial display pattern P1 of the vehicle is displayed, whereby the direction of Mecca with reference to the vehicle can be visually recognized with ease.

Figure 11:
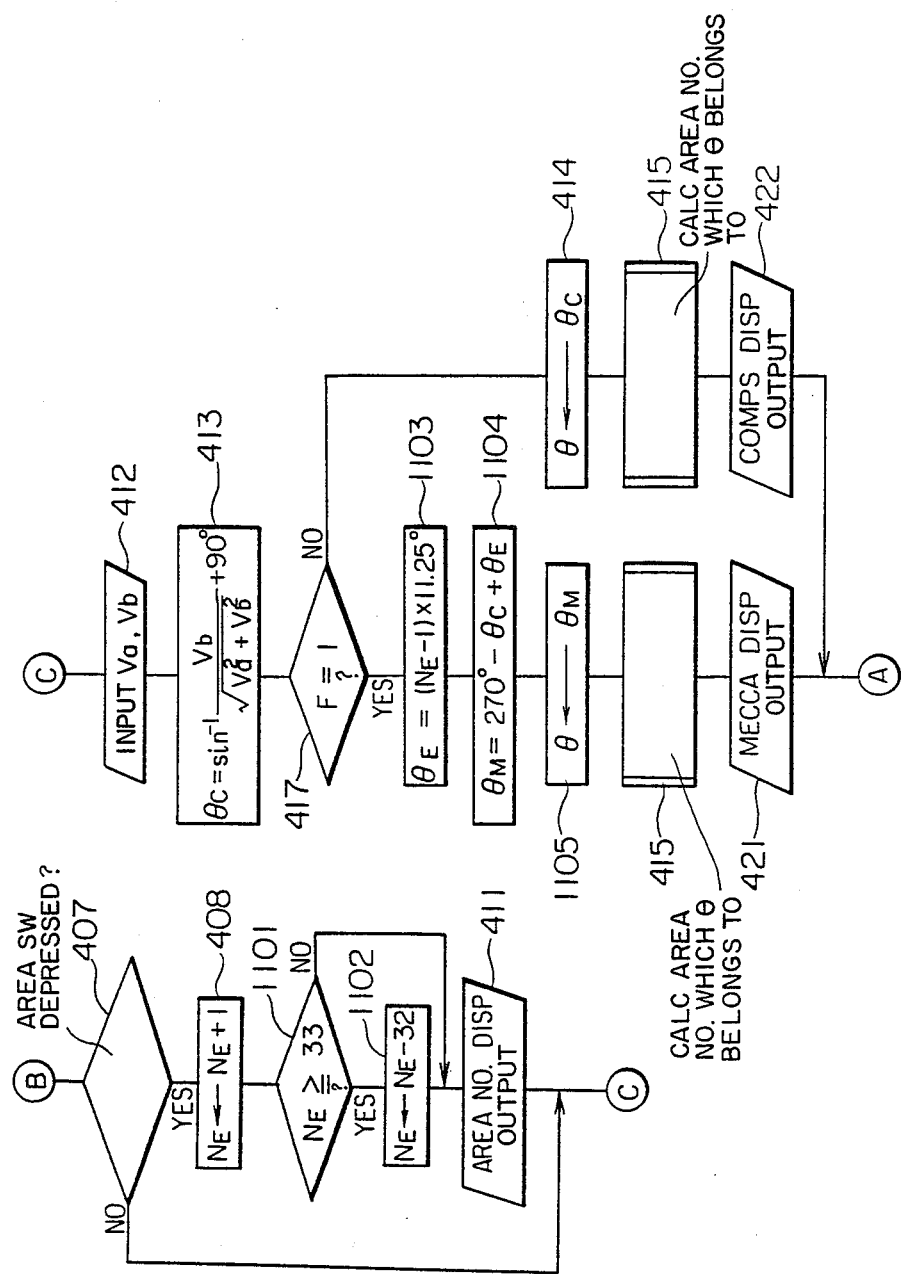
FIG. 11 is a flow chart showing the operation of a direction display apparatus according to another embodiment.
Figure 12:
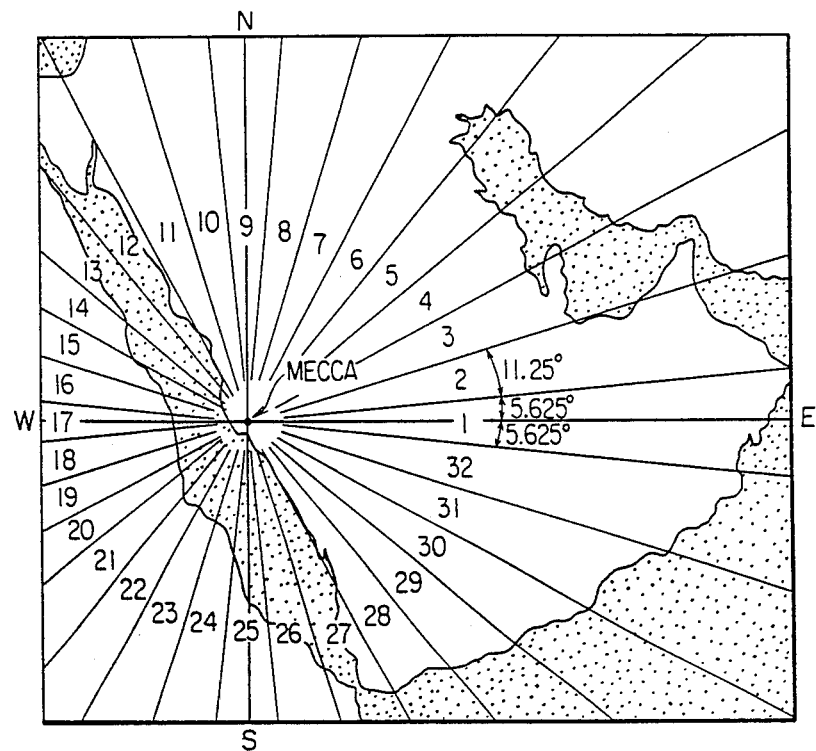
FIG. 12 is a diagram showing a map for use in the other embodiment.

FIG. 11 illustrates another embodiment of this invention. It shows a part of the flow chart in FIG. 4(a), and steps other than those 1101-1105 are the same as in the foregoing embodiment. The schematic arrangement of the hardware of this embodiment is identical to that shown in FIG. 2. In this embodiment, a map which is referred to for inputting the angular coordinate of the current position of the vehicle is divided into 32 areas around Mecca as shown in FIG. 12. Thus, when the area number is input by referring to this map, the area $N_E$ is once converted into the central angular coordinate $\theta_E$ of the area at the step 1103 in FIG. 11, the direction $\theta_M$ of Mecca as viewed from the vehicle is computed using an angle at the step 1104, and the area to which this angle $\theta_M$ belongs is found at the step 415.

According to this embodiment, the number of the indicators of the direction display unit 205 is sixteen as in the preceding embodiment, but the map to be referred to is divided into 32 areas, and the direction $\theta_M$ of Mecca is computed using the same angle as in the program executed by the microcomputer 206, so that the direction $\theta_M$ of Mecca can be computed more precisely.

Assuming by way of example that $\theta_h = 60°$ and $\theta_{ET} = 78°$ hold in FIG. 5, the true direction $\theta_{MT}$ of Mecca becomes:

$$\theta_{MT} = 270° - \theta_c + \theta_E$$
$$= 198°$$

Figure 4:
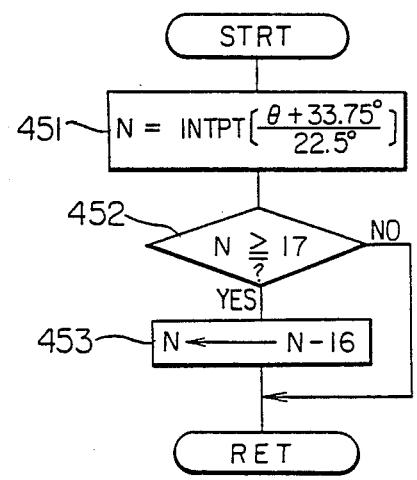

The area in which this angle $\theta_M$ belongs $E_{10}$ in FIG. 9, but in the embodiment shown in FIG. 4, it becomes $E_9$ because the area $E_4$ on the map remains unchanged. In contrast, in the embodiment of FIG. 11, '8' is set as the area number $N_E$ of the map at the steps 407-1102, and the angle $\theta_M$ computed at the step 1104 becomes 198.75°, so that the area number converted at the step 415 becomes '10' to display the indicator pattern $S_{10}$ of the direction display unit 205. It is accordingly possible to display the indicator $S_{10}$ corresponding to the area $E_{10}$ to which the true direction $\theta_{MT}$ of Mecca belongs.

In the foregoing embodiments, the angular coordinate of the vehicle has been input in terms of any of the area numbers allotted to the 16 or 32 divided areas. However, a measure may well be taken wherein the numerical value of an angle obtained by directly measuring the angle with a protractor or by employing a map graduated with angles is input by the use of a well-known keyboard or the like, and the direction of Mecca is evaluated as the angle in the execution of the microcomputer 206, whereupon the indicators of the display pattern to be displayed is selected.

As thus far described, according to the direction display apparatus of this invention, the angular coordinate of a vehicle on a polar coordinate system with an origin set at a specified location is input, the heading of the vehicle at the input location is found so as to calculate the direction of the specified location, and the result is displayed. This brings forth the effect that the direction of the specified location from any location can be displayed through a simple manipulation.

What is claimed is:

1. A direction display apparatus for displaying direction of a specified location from a vehicle, said apparatus comprising a device displaying a pictorial display representing the vehicle, traveling azimuth measurement means to measure and produce an output representing a heading of the vehicle, angular coordinate input means to determine and provide an output representing an angular coordinate of the vehicle on a polar coordinate system with an origin set at the specified location, specified location direction calculation means responsive to outputs of said traveling azimuth measurement means and said angular coordinate input means to determine the direction of the specified location from the vehicle and generate an output representative thereof, and an indicator associated with said device displaying the direction of the specified location with reference to the pictorial display representing the vehicle on the basis of the output of said specified location direction calculation means.

2. A direction display apparatus according to claim 1 including a memory storing codes representing the polar coordinates of a plurality of areas and wherein determines the angular coordinate of an area in which the vehicle is traveling in terms of the corresponding code obtained from said memory.

3. A direction display apparatus for displaying direction of a specified location from a vehicle, said apparatus comprising traveling azimuth measurement means detecting terrestrial magnetism to measure and produce an output representing a heading of the vehicle, first display means having a display for displaying the heading direction of the vehicle on the basis of the detected terrestrial magnetism, angular coordinate input means to determine and provide an output representing an angular coordinate of the vehicle on a polar coordinate system with an origin set at the specified location, specified location direction calculation means responsive to outputs of said traveling azimuth measurement means and said angular coordinate input means to determine the direction of the specified location from the vehicle and generate an output representative thereof, and second display means to display the direction of the specified location on the basis of the output of said specified location direction calculation means.

4. A direction display apparatus according to claim 3 wherein said first display means displaying the traveling direction of the vehicle and said second display means displaying the direction of the specified location are combined into a single display unit selectively operated by a switch.

* * * * *